US012804342B2

(12) United States Patent
Russell et al.

(10) Patent No.: US 12,804,342 B2
(45) Date of Patent: *Nov. 17, 2026

(54) MULTI-DEVICE LOCALIZATION

(71) Applicant: Amazon Technologies, Inc., Seattle, WA (US)

(72) Inventors: Spencer Russell, Quincy, MA (US); Shobha Devi Kuruba Buchannagari, Fremont, CA (US); FNU Anish Kumar, Newark, CA (US); Carlos Renato Nakagawa, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,258

(22) Filed: Jul. 22, 2024

(65) Prior Publication Data

US 2024/0381045 A1 Nov. 14, 2024

Related U.S. Application Data

(63) Continuation of application No. 17/546,567, filed on Dec. 9, 2021, now Pat. No. 12,058,509.

(51) Int. Cl.

| | |
|---|---|
| ***H04S 3/00*** | (2006.01) |
| ***H04R 3/12*** | (2006.01) |
| ***H04R 5/04*** | (2006.01) |
| ***H04S 7/00*** | (2006.01) |

(52) U.S. Cl.

CPC .............. *H04S 3/008* (2013.01); *H04R 3/12* (2013.01); *H04R 5/04* (2013.01); *H04S 7/301* (2013.01)

(58) Field of Classification Search

CPC ........... H04S 3/008; H04S 7/301; H04R 3/12; H04R 5/04

See application file for complete search history.

(56) References Cited

U.S. PATENT DOCUMENTS

| | | | | |
|---|---|---|---|---|
| 7,630,501 | B2 * | 12/2009 | Blank | H04S 7/301 381/59 |
| 9,794,720 | B1 * | 10/2017 | Kadri | H04S 7/303 |
| 10,516,960 | B2 * | 12/2019 | Doolittle | H04S 7/301 |
| 10,824,921 | B2 * | 11/2020 | Bathiche | G06V 40/23 |
| 11,356,789 | B2 * | 6/2022 | Tamaki | H04S 7/30 |

* cited by examiner

*Primary Examiner* — Paul W Huber

(74) *Attorney, Agent, or Firm* — Pierce Atwood LLP

(57) ABSTRACT

A system configured to create a flexible home theater group using a variety of different devices. To enable the home theater group to generate synchronized audio, the system performs device localization to generate map data, which represents locations of devices in a device map. The map data may include a listening position and/or television, such that the map data is centered on the listening position with the television along a vertical axis. To generate the map data, the system selects a primary device that determines calibration data indicating a sequence when each of the individual devices generates playback audio. The primary device sends the calibration data to secondary devices and each device generates playback audio at a designated time in the sequence, enabling other devices to capture the output audio and determine a relative position of the playback device (for example using angle of arrival and distance information). The playback audio may be outside a human hearing range.

20 Claims, 12 Drawing Sheets

MULTI-DEVICE LOCALIZATION

CROSS REFERENCE TO RELATED APPLICATION

This application is a continuation of, and claims priority to U.S. Non-provisional patent application Ser. No. 17/546,567, filed on Dec. 9, 2021, and entitled "MULTI-DEVICE LOCALIZATION," scheduled to issue as U.S. Pat. No. 12,058,509, which is hereby incorporated by reference in its entirety.

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

DETAILED DESCRIPTION

Electronic devices may be used to capture input audio and process input audio data. The input audio data may be used for voice commands and/or sent to a remote device as part of a communication session. In addition, the electronic devices may be used to process output audio data and generate output audio. The output audio may correspond to the communication session or may be associated with media content, such as audio corresponding to music or movies played in a home theater. Multiple devices may be grouped together in order to generate output audio using a combination of the multiple devices.

To improve device grouping and/or audio quality associated with a group of devices, devices, systems and methods are disclosed that perform multi-device localization to generate map data representing a device map. The system may create a flexible home theater group using a variety of different devices, and may perform the multi-device localization to generate the map data, which represents locations of devices in the home theater group. In some examples, the map data may include a listening position and/or television associated with the home theater group, such that the map data is centered on the listening position with the television along a vertical axis. To generate the map data, the system selects a primary device that determines calibration data indicating a sequence when each of the individual devices generates playback audio. The primary device sends the calibration data to secondary devices and each device generates playback audio at a designated time in the sequence, enabling other devices to capture the playback audio and determine a relative position of the playback device (for example using angle of arrival and distance information).

Figure 1:
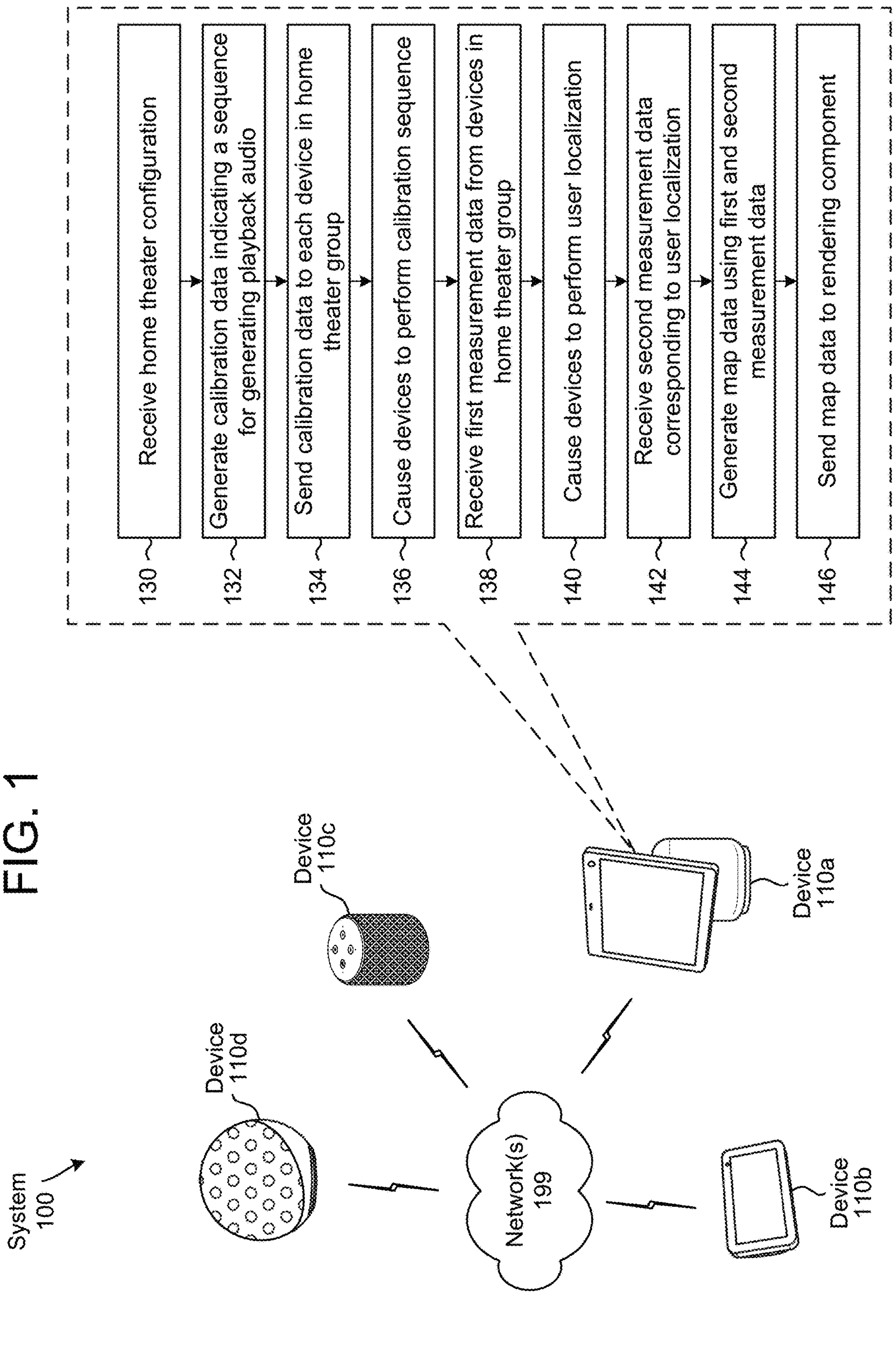
FIG. 1 is a conceptual diagram illustrating a system configured to perform multi-device localization according to embodiments of the present disclosure.

FIG. 1 is a conceptual diagram illustrating a system configured to perform multi-device localization according to embodiments of the present disclosure. As illustrated in FIG. 1, a system 100 may include multiple devices 110*a*/110*b*/110*c*/110*d* connected across one or more networks 199. In some examples, the devices 110 (local to a user) may also be connected to a remote system 120 across the one or more networks 199, although the disclosure is not limited thereto.

The device 110 may be an electronic device configured to capture and/or receive audio data. For example, the device 110 may include a microphone array configured to generate input audio data, although the disclosure is not limited thereto and the device 110 may include multiple microphones without departing from the disclosure. As is known and used herein, "capturing" an audio signal and/or generating audio data includes a microphone transducing audio waves (e.g., sound waves) of captured sound to an electrical signal and a codec digitizing the signal to generate the microphone audio data. In addition to capturing the input audio data, the device 110 may be configured to receive output audio data and generate output audio using one or more loudspeakers of the device 110. For example, the device 110 may generate output audio corresponding to media content, such as music, a movie, and/or the like.

As illustrated in FIG. 1, the system 100 may include four separate devices 110*a*-110*d*, which may be included in a flexible home theater group, although the disclosure is not limited thereto and any number of devices may be included in the flexible home theater group without departing from the disclosure. For example, a user may group the four devices as part of the flexible home theater group and the system 100 may select one of the four devices 110*a*-110*d* as a primary device that is configured to synchronize output audio between the four devices 110*a*-110*d*. In the example illustrated in FIG. 1, the first device 110*a* is the primary device and the second device 110*b*, the third device 110*c*, and the fourth device 110*d* are the secondary devices, although the disclosure is not limited thereto.

As illustrated in FIG. 1, the first device 110*a* may receive (130) a home theater configuration. For example, the user may use a smartphone or other devices and may input the home theater configuration using a user interface. However, the disclosure is not limited thereto, and the system 100 may receive the home theater configuration without departing from the disclosure.

In response to the home theater configuration, the first device 110*a* may generate (132) calibration data indicating a sequence for generating playback audio, may send (134) the calibration data to each device in the home theater group, and may cause (136) the devices to perform the calibration sequence. For example, the calibration data may indicate that the first device 110*a* may generate a first audible sound during a first time range, the second device 110*b* may generate a second audible sound during a second time range, the third device 110*c* may generate a third audible sound during a third time range, and that the fourth device 110*d* ma generate a fourth audible sound during a fourth time range. In some examples there are gaps between the audible sounds, such that the calibration data may be include values of zero (e.g., padded with zeroes between audible sounds), but the disclosure is not limited thereto and the calibration data may not include gaps without departing from the disclosure.

During the calibration sequence, a single device 110 may generate an audible sound and the remaining devices may capture the audible sound in order to determine a relative direction and/or distance. For example, when the first device 110*a* generates the first audible sound, the second device 110*b* may capture the first audible sound by generating first audio data including a first representation of the first audible sound. Thus, the second device 110*b* may perform localization (e.g., sound source localization (SSL) processing and/or the like) using the first audio data and determine a first position of the first device 110*a* relative to the second device 110*b*. Similarly, the third device 110*c* may generate second audio data including a second representation of the first audible sound. Thus, the third device 110*c* may perform localization using the second audio data and may determine a second position of the first device 110*a* relative to the third device 110*c*. Each of the devices 110 may perform these steps to generate audio data and/or determine a relative position of the first device 110*a* relative to the other devices 110, as described in greater detail below with regard to FIGS. 5-6.

After causing the devices to perform the calibration sequence, the first device 110*a* may receive (138) first measurement data from the devices 110 in the home theater group. For example, the first device 110*a* may receive the first measurement data from the second device 110*b*, the third device 110*c*, and the fourth device 110*d*, although the disclosure is not limited thereto.

The first device 110*a* may cause (140) the devices 110 to perform user localization and may receive (142) second measurement data corresponding to the user localization. For example, the system 100 may generate and/or output a notification to the user to speak from a listening position in the room, where the listening position is a location from which the user would like to listen to audio generated by the home theater group. During user localization, the devices 110 may listen for speech, such as a wakeword or other keyword, and may determine a position of the speech relative to the device 110. The system 100 associates the location of the speech with the listening position and may optimize the audio output based on the listening position.

Finally, the first device 110*a* may generate (144) map data using the first measurement data and the second measurement data and may send (146) the map data to a rendering component, as described in greater detail below with regard to FIG. 3. For example, the rendering component may process the map data and determine rendering coefficient values for each of the devices 110*a*-110*d* included in the home theater group.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

The device 110 may include multiple microphones configured to capture sound and pass the resulting audio signal created by the sound to a downstream component. Each individual piece of audio data captured by a microphone may be in a time domain. To isolate audio from a particular direction, the device may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone).

Using such direction isolation techniques, a device 110 may isolate directionality of audio sources. A particular direction may be associated with azimuth angles divided into bins (e.g., 0-45 degrees, 46-90 degrees, and so forth). To isolate audio from a particular direction, the device 110 may apply a variety of audio filters to the output of the microphones where certain audio is boosted while other audio is dampened, to create isolated audio corresponding to a particular direction, which may be referred to as a beam. While in some examples the number of beams may correspond to the number of microphones, the disclosure is not limited thereto and the number of beams may be independent of the number of microphones. For example, a two-microphone array may be processed to obtain more than two beams, thus using filters and beamforming techniques to isolate audio from more than two directions. Thus, the number of microphones may be more than, less than, or the same as the number of beams. The beamformer unit of the device may have an adaptive beamformer (ABF) unit/fixed beamformer (FBF) unit processing pipeline for each beam, although the disclosure is not limited thereto.

Figure 2:
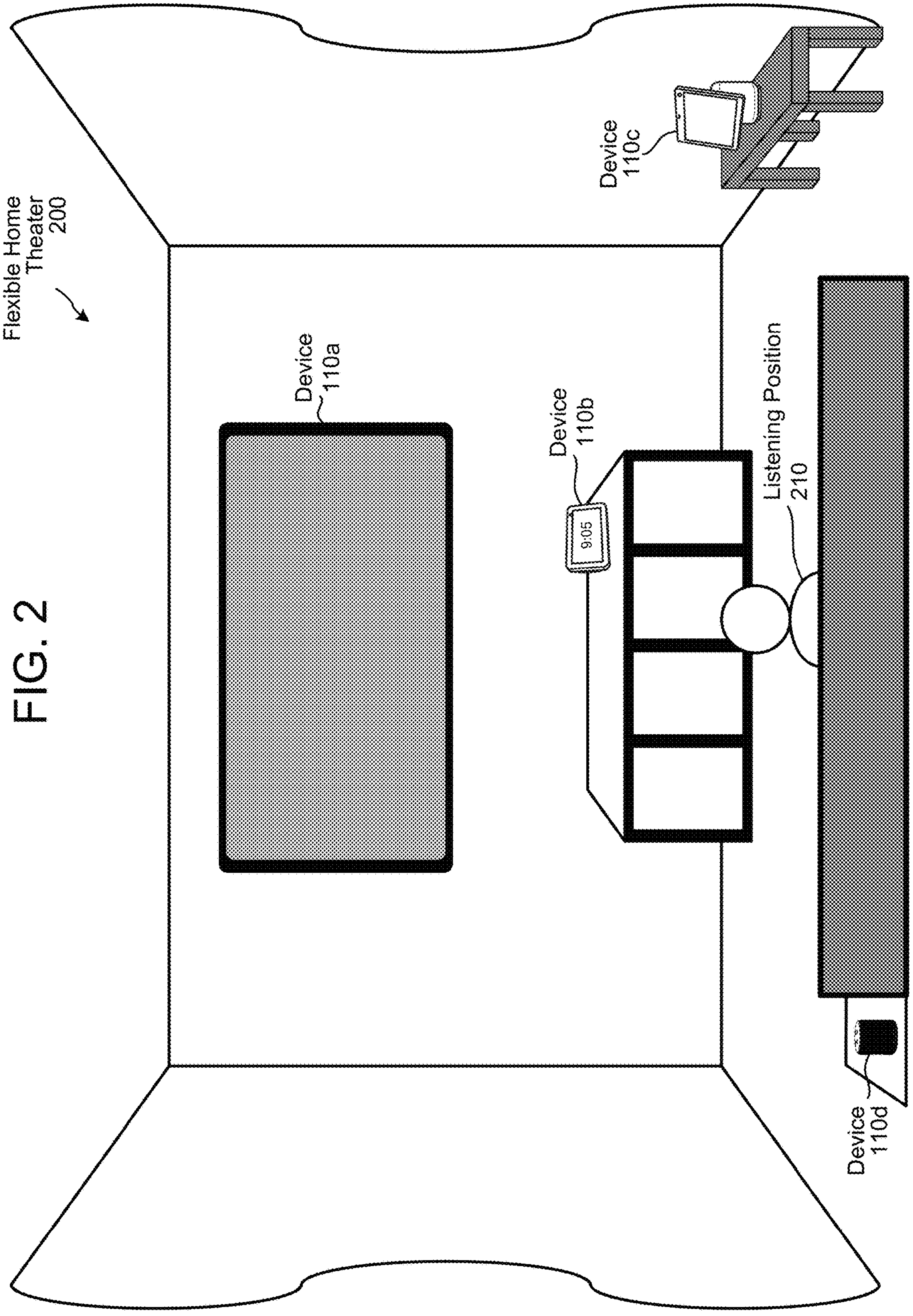
FIG. 2 illustrates an example of a flexible home theater according to embodiments of the present disclosure.

FIG. 2 illustrates an example of a flexible home theater according to embodiments of the present disclosure. As illustrated in FIG. 2, a flexible home theater 200 may comprise a variety of devices 110 without departing from the disclosure. For example, FIG. 2 illustrates an example home theater that includes a first device 110*a* (e.g., television or headless device associated with the television) at a first location, a second device 110*b* (e.g., speech-enabled device with a screen) at a second location below the television, a third device 110*c* (e.g., speech-enabled device with a screen) at a third location to the right of a listening position 210 of the user, and a fourth device 110*d* (e.g., speech-enabled device) at a fourth location to the left of the listening position 210. However, the disclosure is not limited thereto and the flexible home theater 200 may include additional devices 110 without departing from the disclosure. Additionally or alternatively, the flexible home theater 200 may include fewer devices 110 and/or the locations of the devices 110 may vary without departing from the disclosure.

Despite the flexible home theater 200 including multiple different types of devices 110 in an asymmetrical configuration relative to the listening position 210 of the user, the system 100 may generate playback audio optimized for the listening position 210. For example, the system 100 may generate map data indicating the locations of the devices 110, the type of devices 110, and/or other context (e.g., number of loudspeakers, frequency response of the drivers, etc.), and may send the map data to a rendering component. The rendering component may generate individual renderer coefficient values for each of the devices 110, enabling each individual device 110 to generate playback audio that takes into account the location of the device 110 and characteristics of the device 110 (e.g., frequency response, etc.).

To illustrate a first example, the second device 110*b* may act as a center channel in the flexible home theater 200 despite being slightly off-center below the television. For example, first renderer coefficient values associated with the second device 110*b* may adjust the playback audio generated by the second device 110*b* to shift the sound stage to the left from the perspective of the listening position 210 (e.g., centered under the television). To illustrate a second example, the third device 110*c* may act as a right channel and the fourth device 110*d* may act as a left channel in the flexible home theater 200, despite being different distances from the listening position 210. For example, second renderer coefficient values associated with the third device 110*c* and fourth renderer coefficient values associated with the fourth device 110*d* may adjust the playback audio generated by the third device 110*c* and the fourth device 110*d* such that the two channels are balanced from the perspective of the listening position 210.

Figure 3:
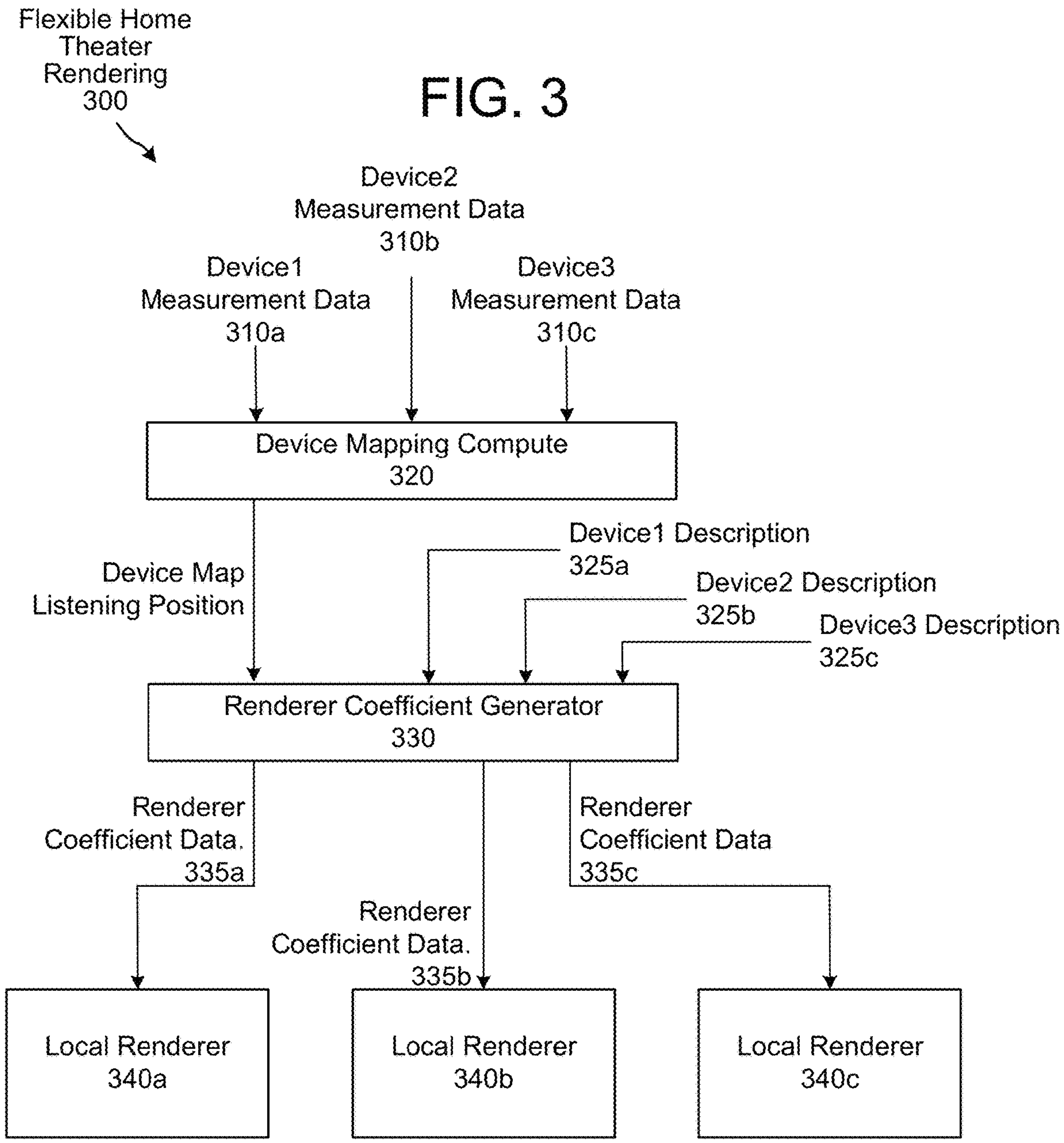
FIG. 3 illustrates an example component diagram for rendering audio data in a flexible home theater according to embodiments of the present disclosure.

FIG. 3 illustrates an example component diagram for rendering audio data in a flexible home theater according to embodiments of the present disclosure. As illustrated in FIG. 3, the system 100 may perform flexible home theater rendering 300 to generate individual flexible renderer coefficient values for each of the devices 110 included in the flexible home theater group. First, the system 100 may cause each device 110 included in the flexible home theater group to generate measurement data during a calibration sequence, as will be described in greater detail below with regard to FIG. 6. For example, a first device (e.g., Device1) may generate first measurement data 310*a*, a second device (e.g., Device2) may generate second measurement data 310*b*, and a third device (e.g., Device3) may generate third measurement data 310*c*. While the example illustrated in FIG. 3 only includes three devices 110 in the flexible home theater, the disclosure is not limited thereto and the flexible home theater may have any number of devices 110 without departing from the disclosure.

The first device may generate the first measurement data 310*a* by generating first audio data capturing one or more audible sounds and performing sound source localization processing to determine direction(s) associated with the audible sound(s) represented in the first audio data. For example, if the second device is generating first playback audio during a first time range, the first device may capture a representation of the first playback audio and perform sound source localization processing to determine that the second device is in a first direction relative to the first device, although the disclosure is not limited thereto. Similarly, the second device may generate the second measurement data 310*b* by generating second audio data capturing one or more audible sounds and performing sound source localization processing to determine direction(s) associated with the audible sound(s) represented in the second audio data. For example, if the third device is generating second playback audio during a second time range, the second device may capture a representation of the second playback audio and perform SSL processing to determine that the third device is in a second direction relative to the second device, although the disclosure is not limited thereto.

As illustrated in FIG. 3, a device mapping compute component 320 may receive the measurement data 310 and may generate device map data representing a device map and/or generate listening position data indicating the listening position 210 associated with the user. For example, a primary device (e.g., mapping coordinator) may receive the measurement data 310 from secondary devices and may process the measurement data 310 to generate the device map indicating a location of each of the devices 110 in the flexible home theater group. Additionally or alternatively, the mapping compute component 320 may receive measurement data 310 corresponding to the user (e.g., user localization) and may process the measurement data 310 to determine the listening position 210 associated with the user, as will be described in greater detail below with regard to FIG. 6.

The device mapping compute component 320 may output the device map data and/or the listening position data to a renderer coefficient generator component 330 that is configured to generate the flexible renderer coefficient values. In addition, the renderer coefficient generator component 330 may receive device descriptors associated with each of the devices 110 included in the flexible home theater group. For example, the renderer coefficient generator component 330 may receive a first description 325*a* corresponding to the first device (e.g., Device1), a second description 325*b* corresponding to the second device (e.g., Device2), and a third description 325*c* corresponding to the third device (e.g., Device3).

In some examples, the renderer coefficient generator component 330 may receive these descriptions directly from each of the devices 110 included in the flexible home theater group. However, the disclosure is not limited thereto, and in other examples the renderer coefficient generator component 330 may receive the descriptions from a single device (e.g., storage component, remote system 120, etc.) without departing from the disclosure. For example, the renderer coefficient generator component 330 may receive the device descriptions form the device mapping compute component 320 without departing from the disclosure.

Figure 4:
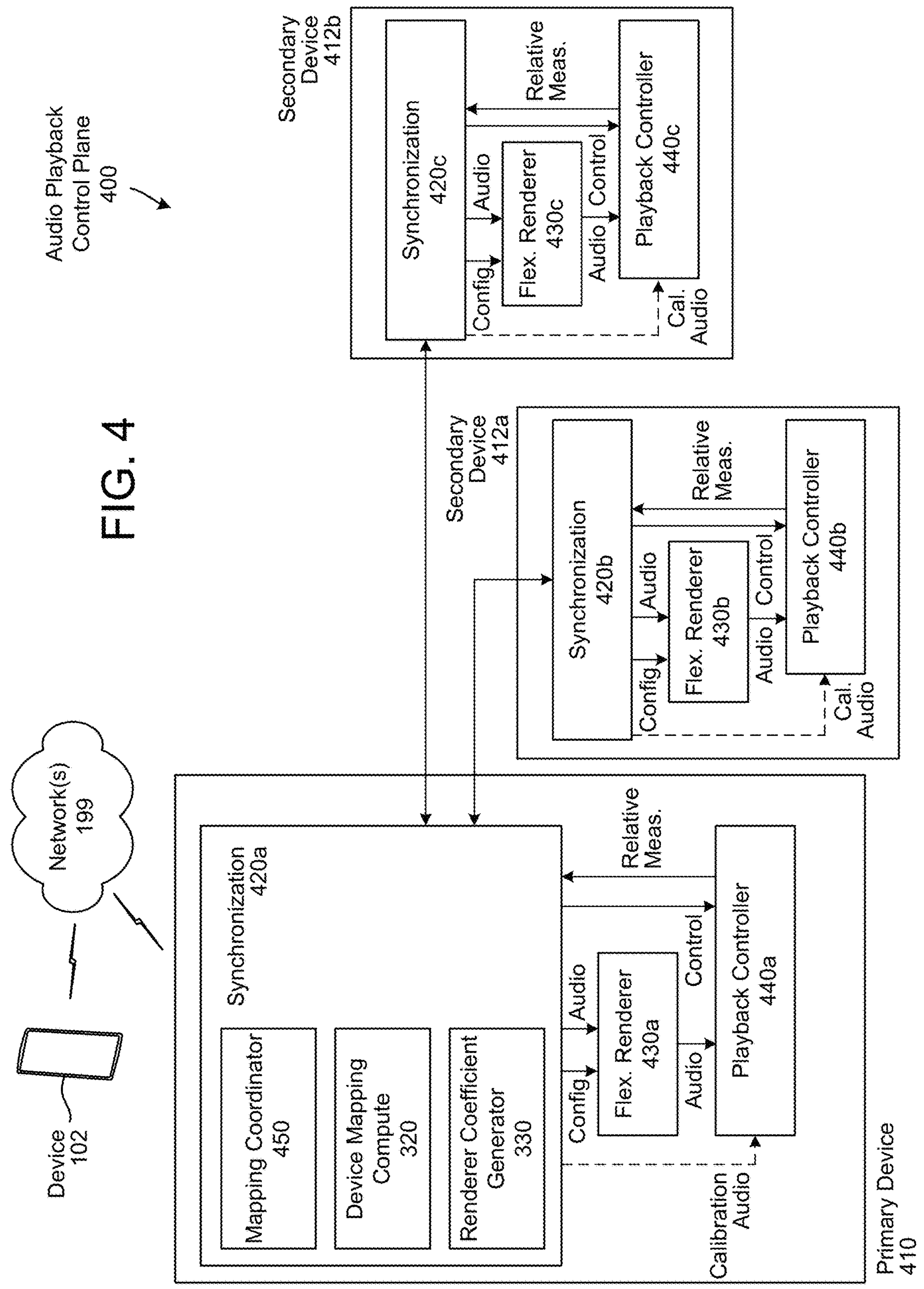
FIG. 4 illustrates an example component diagram for performing multi-device localization and rendering according to embodiments of the present disclosure.

The renderer coefficient generator component 330 may process the device map, the listening position, the device descriptions, and/or additional information (not illustrated) to generate flexible renderer coefficient values for each of the devices 110 included in the flexible home theater group. For example, the renderer coefficient generator component 330 may generate first renderer coefficient data 335*a* (e.g., first renderer coefficient values) for a first local renderer 340*a* associated with the first device, second renderer coefficient data 335*b* (e.g., second renderer coefficient values) for a second local renderer 340*b* associated with the second device, and third renderer coefficient data 335*c* (e.g., third renderer coefficient values) for a third local renderer 340*c* associated with the third device, although the disclosure is not limited thereto. As illustrated in FIG. 4, each of the devices 110 may include a local renderer 340 configured to apply the flexible renderer coefficient values calculated for the individual device in order to generate the playback audio.

FIG. 4 illustrates an example component diagram for performing multi-device localization and rendering according to embodiments of the present disclosure. In some examples, the system 100 may receive input data indicating two or more devices 110 to include in a flexible home theater group. For example, the user may select which device 110 to include in the flexible home theater group using a touchscreen device 102 (e.g., smartphone), although the disclosure is not limited thereto. The system 100 may receive the flexible home theater group selection indicated by the input data and may send instructions to each of the devices included in the flexible home theater group in order to form the flexible home theater group and designate one of the devices as a primary device 410. Thus, the primary device 410 coordinates with the remaining devices (e.g., secondary devices 412) to generate synchronized playback audio.

As illustrated in FIG. 4, an audio playback control plane 400 includes synchronization components 420 integrated with each device 110 included in the flexible home theater group. For example, FIG. 4 illustrates an example in which the flexible home theater group includes a primary device 410 that includes a first synchronization component 420*a*, a first secondary device 412*a* that includes a second synchronization component 420*b*, and a second secondary device 412*b* that includes a third synchronization component 420*c*, although the disclosure is not limited thereto. The synchronization components 420 may synchronize audio between each of the devices 110 included in the flexible home theater group so that the user perceives synchronized playback audio (e.g., playback audio reaches the user without time delays or other issues that reduce audio quality). For example, the synchronization components 420 may synchronize a system clock and/or timing between the devices 110 and controls when the audio is generated by each of the devices 110.

During audio playback, the synchronization component 420 may send unprocessed audio data to a flexible renderer component 430, which may perform rendering to generate processed audio data and may send the processed audio data to a playback controller 440 for audio playback. For example, the flexible renderer component 430 may render the unprocessed audio data using the flexible renderer coefficient values calculated by the renderer coefficient generator component 330, as described above with regard to FIG. 3.

To illustrate an example of generating first playback audio, a first flexible renderer component 430*a* associated with the primary device 410 may receive configuration data (e.g., first flexible renderer coefficient values and/or the like) and first unprocessed audio data from the first synchronization component 420*a*. The first flexible renderer component 430*a* may render the first unprocessed audio data using the first flexible renderer coefficient values to generate first processed audio data. The first flexible renderer component 430*a* may send the first processed audio data to a first playback controller component 440*a*, which may also receive first control information from the first synchronization component 420*a*. Based on the first control information, the first playback controller component 440*a* may generate first playback audio using first loudspeakers associated with the primary device 410. In some examples, such as during the calibration sequence, the first playback controller component 440*a* may generate first measurement data corresponding to relative measurements and may send the first measurement data to the first synchronization component 420*a*.

Similarly, the first secondary device 412*a* may generate second playback audio using the second synchronization component 420*b*, a second flexible renderer component 430*b*, and a second playback controller component 440*b*. For example, the second flexible renderer component 430*b* may receive second unprocessed audio data from the second synchronization component 420*b* and may render the second unprocessed audio data using second flexible renderer coefficient values to generate second processed audio data. The second flexible renderer component 430*b* may send the second processed audio data to the second playback controller component 440*b*, which may also receive second control information from the second synchronization component 420*b*. Based on the second control information, the second playback controller component 440*b* may generate second playback audio using second loudspeakers associated with the first secondary device 412*a*. In some examples, such as during the calibration sequence, the second playback controller component 440*b* may generate second measurement data corresponding to relative measurements and may send the second measurement data to the second synchronization component 420*b*. The second synchronization component 420*b* may send the second measurement data to the first synchronization component 420*a* associated with the primary device 410.

The second secondary device 412*b* may perform the same steps described above with regard to the first secondary device 412*a* to generate third playback audio and/or third measurement data and send the third measurement data to the first synchronization component 420*a*. While FIG. 4 illustrates an example including only three devices 110 in the flexible home theater group (e.g., primary device 410, first secondary device 412*a*, and second secondary device 412*b*), this is intended to conceptually illustrate an example and the disclosure is not limited thereto. Thus, the flexible home theater group may include any number of secondary devices 412 that interface with the primary device 410 to generate playback audio without departing from the disclosure.

As illustrated in FIG. 4, the primary device 410 may include the device mapping compute component 320 and the renderer coefficient generator component 330 described above with regard to FIG. 3, although the disclosure is not limited thereto. In addition, the primary device 410 may include a mapping coordinator component 450 that is configured to generate calibration data (e.g., a calibration sequence or calibration schedule) and cause each of the secondary devices 412 to perform the calibration sequence based on the calibration data. Thus, the mapping coordinator component 450 may generate the calibration data to indicate to the secondary devices 412 which individual device is expected to generate an audible sound at a particular time range. For example, the calibration data may indicate that the primary device 410 will generate a first audible sound during a first time range, the first secondary device 412*a* will generate a second audible sound during a second time range following the first time range, and the second secondary device 412*b* will generate a third audible sound during a third time range following the second time range.

While FIG. 4 illustrates an example in which the primary device 410 includes the device mapping compute component 320, the renderer coefficient generator component 330, and/or the mapping coordinator component 450, the disclosure is not limited thereto. Instead, the primary device 410 may include the mapping coordinator component 450 and the device mapping compute component 320 and/or the renderer coefficient generator component 330 may be located on a separate device without departing from the disclosure. Additionally or alternatively, while FIG. 4 illustrates an example in which the primary device 410 is configured to generate the first audible sound, the disclosure is not limited thereto and the primary device 410 may not be configured to generate an audible sound without departing from the disclosure. For example, the primary device 410 may not include loudspeaker(s) and/or microphone(s) and therefore may not perform the calibration process described below without departing from the disclosure.

Based on the calibration data, the primary device 410 may generate the first audible sound during the first time range and each of the devices 410/412*a*/412*b* may generate a first portion of respective measurement data corresponding to the first audible sound. Similarly, the first secondary device 412*a* may generate the second audible sound during the second time range and each of the devices 410/412*a*/412*b* may generate a second portion of respective measurement data corresponding to the second audible sound. Finally, the second secondary device 412*b* may generate the third audible sound during the third time range and each of the devices 410/412*a*/412*b* may generate a third portion of respective measurement data corresponding to the third audible sound.

During the calibration sequence, the playback controller component 440 may receive calibration audio directly from the synchronization component 420, bypassing the flexible renderer component 430, which is illustrated in FIG. 4 as a dashed line. For example, the playback controller component 440 may receive raw audio data representing a calibration tone from the synchronization component 420 and may generate the audible sounds using this raw audio data. However, the disclosure is not limited thereto and the playback controller component 440 may receive the raw audio data from the synchronization component 420 via the flexible renderer component 430 (e.g., without any processing being performed by the flexible renderer component 430) without departing from the disclosure.

After the first playback controller component 440*a* of the primary device 410 generates the first measurement data, the first playback controller component 440*a* may send the first measurement data to the device mapping compute component 320 via the first synchronization component 420*a*. Similarly, after the second playback controller component 440*b* of the first secondary device 412*a* generates the second measurement data, the second synchronization component 420*b* may send the second measurement data to the device mapping compute component 320 via the first synchronization component 420*a*. Finally, after the third playback controller component 440*c* of the second secondary device 412*b* generates the third measurement data, the third synchronization component 420*c* may send the third measurement data to the device mapping compute component 320 via the first synchronization component 420*a*.

In some examples, the measurement data generated by the playback controller component 440 corresponds to the measurement data 310 described above with regard to FIG. 3. For example, the first playback controller component 440*a* may generate Device1 measurement data 310*a*, the second playback controller component 440*b* may generate Device2 measurement data 310*b*, and the third playback controller component 440*c* may generate Device3 measurement data 310*c*. However, the disclosure is not limited thereto, and in other examples the measurement data generated by the playback controller component 440 may be processed by another component to generate the measurement data 310. For example, a first component within the primary device 410 (e.g., first synchronization component 420*a* or a different component) may process the first measurement data to generate the Device1 measurement data 310*a*, a second component within the first secondary device 412*a* may process the second measurement data to generate the Device2 measurement data 310*b*, and a third component within the second secondary device 412*b* may process the third measurement data to generate the Device3 measurement data 310*c*.

Additionally or alternatively, the primary device 410 may receive measurement data from the secondary devices 412 and may process the measurement data to generate the measurement data 310. For example, a component of the primary device 410 may receive the first measurement data from the first playback controller component 440*a* and may generate Device1 measurement data 310*a*, may receive the second measurement data from the first secondary device 412*a* and may generate the Device2 measurement data 310*b*, and may receive the third measurement data from the second secondary device 412*b* and may generate the Device3 measurement data 310*c*, although the disclosure is not limited thereto.

The device mapping compute component 320 may process the measurement data 310 to generate the device map data and/or the listening position data, as described in greater detail above with regard to FIG. 3. In addition, the renderer coefficient generator component 330 may process the device map data, the listening position data, and/or device description data 325 to generate the flexible renderer coefficient values 335. For example, the renderer coefficient generator component 330 may generate the first renderer coefficient data 335*a* (e.g., first renderer coefficient values) for the first flexible renderer component 430*a* associated with the primary device 410, second renderer coefficient data 335*b* (e.g., second renderer coefficient values) for the second flexible renderer component 430*b* associated with the first secondary device 412*a*, and third renderer coefficient data 335*c* (e.g., third renderer coefficient values) for the third flexible renderer component 430*c* associated with the second secondary device 412*b*.

Figure 5:
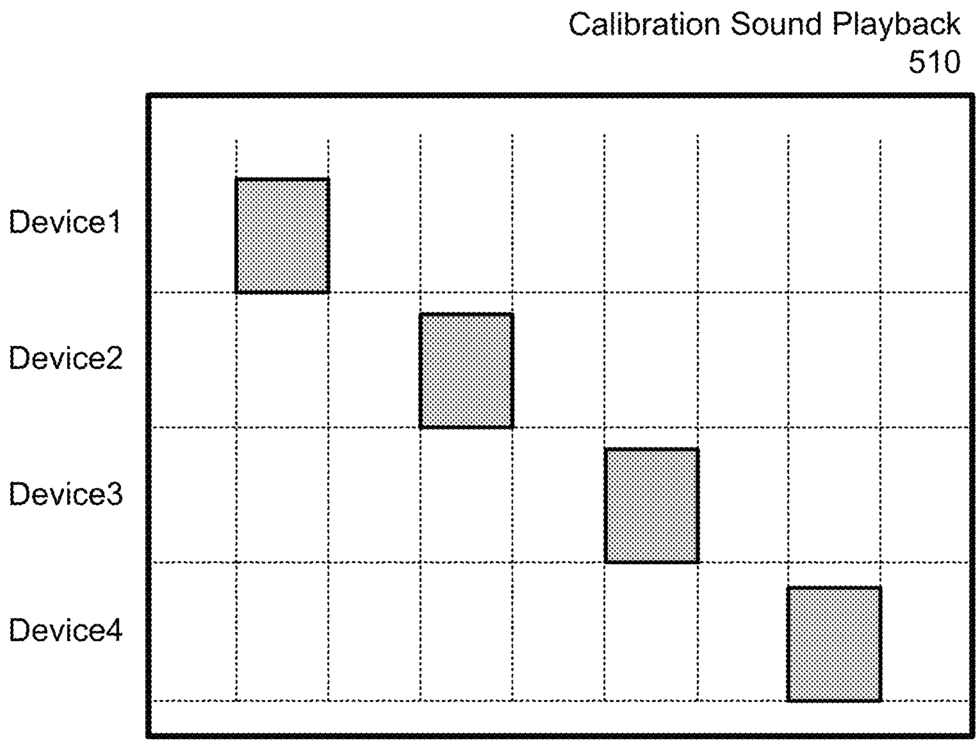
FIG. 5 illustrates examples of calibration sound playback and calibration sound capture according to embodiments of the present disclosure.
Figure 5:
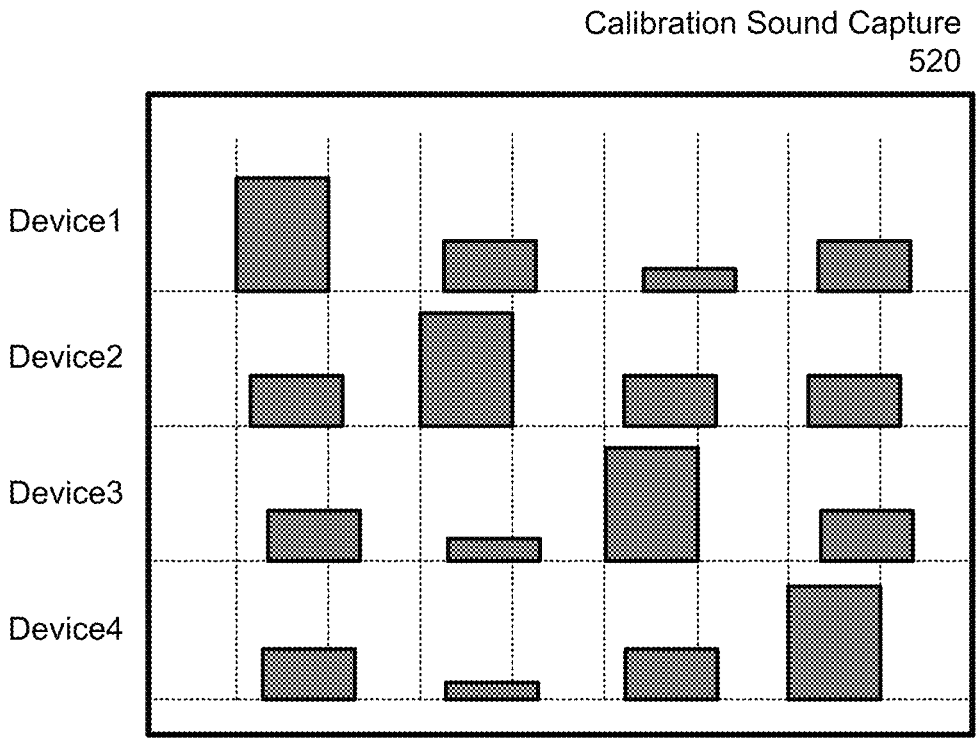

FIG. 5 illustrates examples of calibration sound playback and calibration sound capture according to embodiments of the present disclosure. As illustrated in FIG. 5, the calibration data may indicate a calibration sequence illustrated by calibration sound playback 510. For example, a first device (Device1) may generate a first audible sound during a first time range, a second device (Device2) may generate a second audible sound during a second time range, a third device (Device3) may generate a third audible sound during a third time range, and a fourth device (Device4) may generate a fourth audible sound during a fourth time range.

The measurement data generated by each of the devices is represented in calibration sound capture 520. For example, the calibration sound capture 520 illustrates that while the first device (Device1) captures the first audible sound immediately, the other devices capture the first audible sound after variable delays caused by a relative distance from the first device to the capturing device. To illustrate a first example, the first device (Device1) may generate first audio data that includes a first representation of the first audible sound within the first time range and at a first volume level (e.g., amplitude). However, the second device (Device2) may generate second audio data that includes a second representation of the first audible sound after a first delay and at a second volume level that is lower than the first volume level. Similarly, the third device (Device3) may generate third audio data that includes a third representation of the first audible sound after a second delay and at a third volume level that is lower than the first volume level, and the fourth device (Device4) may generate fourth audio data that includes a fourth representation of the first audible sound after a third delay and at a fourth volume level that is lower than the first volume level.

Similarly, the second audio data may include a first representation of the second audible sound within the second time range and at a first volume level. However, the first audio data may include a second representation of the second audible sound after a first delay and at a second volume level that is lower than the first volume level, the third audio data may include a third representation of the second audible sound after a second delay and at a third volume level that is lower than the first volume level, and the fourth audio data may include a fourth representation of the second audible sound after a third delay and at a fourth volume level that is lower than the first volume level.

As illustrated in FIG. 5, the third audio data may include a first representation of the third audible sound within the third time range and at a first volume level. However, the first audio data may include a second representation of the fourth audible sound after a first delay and at a second volume level that is lower than the first volume level, the second audio data may include a third representation of the fourth audible sound after a second delay and at a third volume level that is lower than the first volume level, and the fourth audio data may include a fourth representation of the fourth audible sound after a third delay and at a fourth volume level that is lower than the first volume level.

Finally, the fourth audio data may include a first representation of the fourth audible sound within the fourth time range at a first volume level. However, the first audio data may include a second representation of the second audible sound after a first delay and at a second volume level that is lower than the first volume level, the second audio data may include a third representation of the fourth audible sound after a second delay and at a third volume level that is lower than the first volume level, and the third audio data may include a fourth representation of the fourth audible sound after a third delay and at a fourth volume level that is lower than the first volume level. Based on the different delays and/or amplitudes, the system 100 may determine a relative position of each of the devices within the environment.

Figure 6:
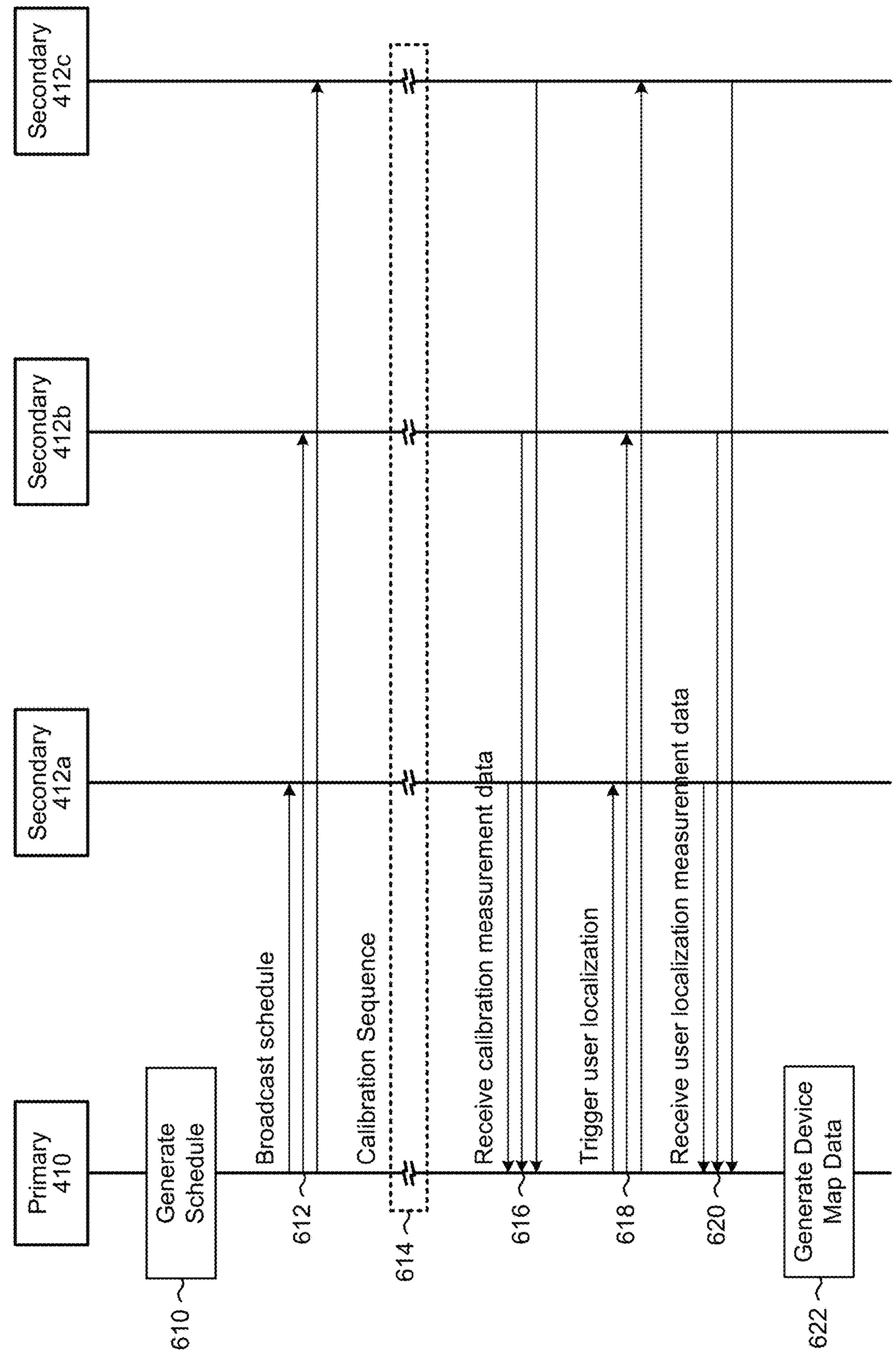
FIG. 6 is a communication diagram illustrating an example of performing multi-device localization according to embodiments of the present disclosure.

FIG. 6 is a communication diagram illustrating an example of performing multi-device localization according to embodiments of the present disclosure. As illustrated in FIG. 6, the primary device 410 may generate (610) a schedule for performing a calibration sequence, as described above with regard to FIG. 4. For example, the primary device 410 may generate calibration data to indicate to the secondary devices 412 which individual device is expected to generate an audible sound at a particular time range. For example, the calibration data may indicate that the primary device 410 will generate a first audible sound during a first time range, the first secondary device 412*a* will generate a second audible sound during a second time range, and the second secondary device 412*b* will generate a third audible sound during a third time range.

The primary device 410 may broadcast (612) the schedule to each of the secondary devices 412 and may start (614) the calibration sequence. For example, the primary device 410 may send the calibration data to the first secondary device 412*a*, to the second secondary device 412*b*, to a third secondary device 412*c*, and/or to any additional secondary devices 412 included in the flexible home theater group. Each of the devices 410/412 may start the calibration sequence based on the calibration data received from the primary device 410. For example, during the first time range the primary device 410 may generate the first audible sound while the secondary devices 412 generate audio data including representations of the first audible sound. Similarly, during the second time range the first secondary device 412*a* may generate the second audible sound while the primary device 410 and/or the secondary devices 412 generate audio data including representations of the second audible sound. In some examples, the primary device 410 and/or one of the secondary devices 412 may not include a microphone and therefore may not generate audio data during the calibration sequence. However, the other devices may still determine a relative position of the primary device 410 based on the first audible sound generated by the primary device 410.

The primary device 410 may receive (616) calibration measurement data from the secondary devices 412. For example, the secondary devices 412 may process the audio data and generate the calibration measurement data by comparing a delay between when an audible sound was scheduled to be generated and when the audible sound was captured by the secondary device 412. To illustrate an example, the first secondary device 412*a* may perform sound source localization to determine an angle of arrival (AOA) associated with the second secondary device 412*b*, although the disclosure is not limited thereto. Additionally or alternatively, the first secondary device 412*a* may determine timing information associated with the secondary device 412*b*, which may be used to determine a distance between the first secondary device 412*a* and the second secondary device 412*b*, although the disclosure is not limited thereto. While not illustrated in FIG. 6, in some examples the primary device 410 may generate calibration measurement data as well, if the primary device 410 includes a microphone and is configured to generate audio data.

The primary device 410 may trigger (618) user localization and may receive (620) user localization measurement data from each of the secondary devices 412. For example, the primary device 410 may send instructions to the secondary devices 412 to perform user localization and the instructions may cause the secondary devices 412 to begin the user localization process. During the user localization process, the secondary devices 412 may be configured to capture audio in order to detect a wakeword or other audible sound generated by the user and generate the user localization measurement data corresponding to the user. For example, the system 100 may instruct the user to speak the wakeword from the user's desired listening position 210 and the user localization measurement data may indicate a relative direction and/or distance from each of the devices 410/412 to the listening position 210. While not illustrated in FIG. 6, in some examples the primary device 410 may also generate user localization measurement data if the primary device 410 includes a microphone and is configured to generate audio data.

While FIG. 6 illustrates an example in which the secondary devices 412 perform user localization and generate user localization measurement data, the disclosure is not limited thereto. In some examples, the system 100 may perform user localization using input data from other devices and/or sensors without departing from the disclosure. For example, the system 100 may know the location of the user based on location data associated with the device 102 (e.g., user may interact with the device 102 while the device 102 is at the listening position 210), location data generated using image data (e.g., computer vision processing identifying the user at the listening position 210), location data generated using distance sensors (e.g., distance sensors and/or other inputs identifying the user at the listening position 210), historical data (e.g., detecting speech from the listening position 210 over a prolonged period of time), and/or the like without departing from the disclosure. Thus, steps 618-620 may be optional without departing from the disclosure.

After receiving the calibration measurement data and the user localization measurement data, the primary device 410 may generate (622) device map data representing a device map for the flexible home theater group. For example, the primary device 410 may process the calibration measurement data in order to generate a final estimate of device locations, interpolating between the calibration measurement data generated by individual devices 410/412. Additionally or alternatively, the primary device 410 may process the user localization measurement data to generate a final estimate of the listening position 210, interpolating between the user localization measurement data generated by individual devices 410/412.

If the flexible home theater group does not include a display such as a television, the primary device 410 may generate the device map based on the listening position 210, but an orientation of the device map may vary. For example, the primary device 410 may set the listening position 210 as a center point and may generate the device map extending in all directions from the listening position 210. However, if the flexible home theater group includes a television, the primary device 410 may set the listening position 210 as a center point and may select the orientation of the device map based on a location of the television. For example, the primary device 410 may determine the location of the television and may generate the device map with the location of the television extending along a vertical axis, although the disclosure is not limited thereto.

To determine the location of the television, in some examples the primary device 410 may generate calibration data instructing the television to generate a first audible noise using a left channel during a first time range and generate a second audible noise using a right channel during a second time range. Thus, each of the secondary devices 412 may generate calibration measurement data including separate calibration measurements for the left channel and the right channel, such that a first portion of the calibration measurement data corresponds to a first location associated with the left channel and a second portion of the calibration measurement data corresponds to a second location associated with the right channel. This enables the primary device 410 to determine the location of the television based on the first location and the second location, although the disclosure is not limited thereto.

Figure 7:
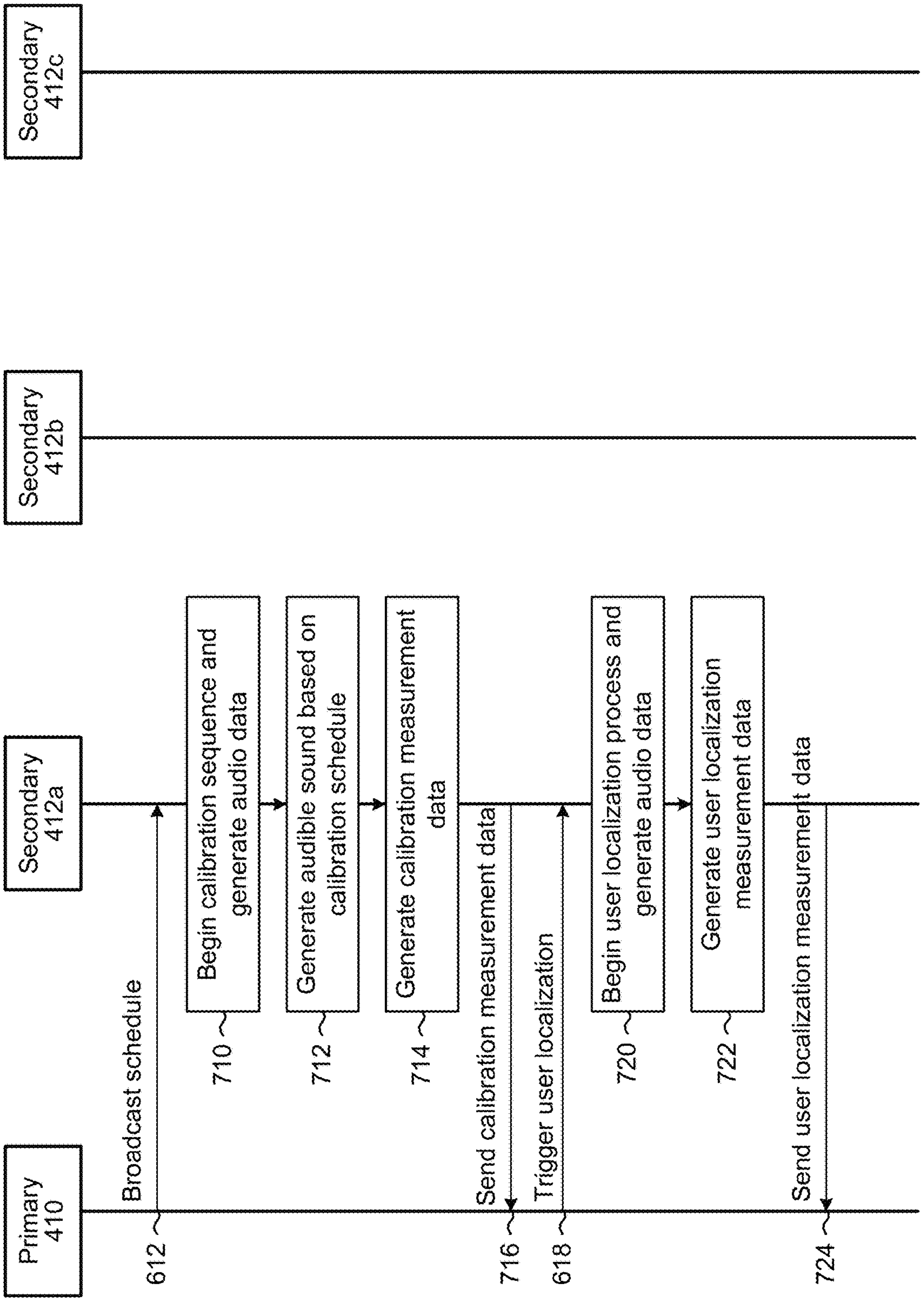
FIG. 7 is a communication diagram illustrating an example of performing localization by an individual device according to embodiments of the present disclosure.

FIG. 7 is a communication diagram illustrating an example of performing localization by an individual device according to embodiments of the present disclosure. As illustrated in FIG. 7, the primary device 400 may broadcast (612) the schedule to the first secondary device 412*a* and the first secondary device 412*a* may begin (710) the calibration sequence and generate audio data. For example, during the calibration sequence the first secondary device 412*a* may begin generate audio data capturing audible sounds generated by the primary device 410, the second secondary device 412*b*, the third secondary device 412*c*, and/or additional devices included in the flexible home theater group. In addition, the first secondary device 412*a* may generate (712) an audible sound based on the calibration schedule, which is also captured in the audio data generated by the first secondary device 412*a*. Thus, the first secondary device 412*a* generates audio data that includes a representation of each of the audible sounds generated during the calibration sequence.

Using this audio data, the first secondary device 412*a* may generate (714) calibration measurement data and may send (716) the calibration measurement data to the primary device 410. For example, the first secondary device 412*a* may perform SSL processing to determine a relative direction between the first secondary device 412*a* and the primary device 410, the second secondary device 412*b*, the third secondary device 412*c*, and/or any additional devices included in the flexible home theater group. Thus, the calibration measurement data may indicate that the primary device 410 is in a first direction relative to the first secondary device 412*a*, that the second secondary device 412*b* is in a second direction relative to the first secondary device 412*a*, and that the third secondary device 412*c* is in a third direction relative to the first secondary device 412*a*. In some examples, the first secondary device 412*a* may determine timing information between the first secondary device 412*a* and the remaining devices, which the primary device 410 may use to determine distances between the first secondary device 412*a* and each of the other devices.

While FIG. 7 illustrates that the first secondary device 412*a* generates audio data in step 710 and generates calibration measurement data in step 714, the disclosure is not limited thereto. In some examples, the first secondary device 412*a* may not generate the audio data and/or the calibration measurement data without departing from the disclosure. For example, the first secondary device 412*a* may correspond to a television or other device that does not include a microphone. In this example, the television would still perform step 712 to generate an audible sound based on the calibration schedule, and in some examples would generate a first audible sound using a left channel and a second audible sound using a right channel, but would not generate the audio data and/or the calibration measurement data in steps 710 and 714 without departing from the disclosure.

After receiving the calibration measurement data, the primary device 410 may trigger (618) user localization and the first secondary device 412*a* may begin (720) the user localization process and generate audio data. For example, the first secondary device 412*a* may generate audio data and perform wakeword detection (e.g., keyword detection) and/or the like to detect speech generated by the user that is represented in the audio data. Once the first secondary device 412*a* detects the speech, the first secondary device 412*a* may generate (722) user localization measurement data indicating a relative direction and/or distance from the first secondary device 412*a* to the listening position 210 associated with the user and may send (724) the user localization measurement data to the primary device 410.

While FIG. 7 illustrates an example in which the secondary devices 412 perform user localization and generate user localization measurement data, the disclosure is not limited thereto. In some examples, the system 100 may perform user localization using input data from other devices and/or sensors without departing from the disclosure. For example, the system 100 may know the location of the user based on location data associated with the device 102 (e.g., user may interact with the device 102 while the device 102 is at the listening position 210), location data generated using image data (e.g., computer vision processing identifying the user at the listening position 210), location data generated using distance sensors (e.g., distance sensors and/or other inputs identifying the user at the listening position 210), historical data (e.g., detecting speech from the listening position 210 over a prolonged period of time), and/or the like without departing from the disclosure. Thus, step 618 and steps 720-724 may be optional without departing from the disclosure.

While FIG. 7 illustrates an example of the first secondary device 412*a* performing steps 710-724, this is intended to conceptually illustrate steps performed by any of the secondary devices 412. Thus, each of the secondary devices 412 (e.g., second secondary device 412*b*, third secondary device 412*c*, etc.) may be performing steps 710-724 to generate calibration measurement data and user localization measurement data without departing from the disclosure.

Figure 8:
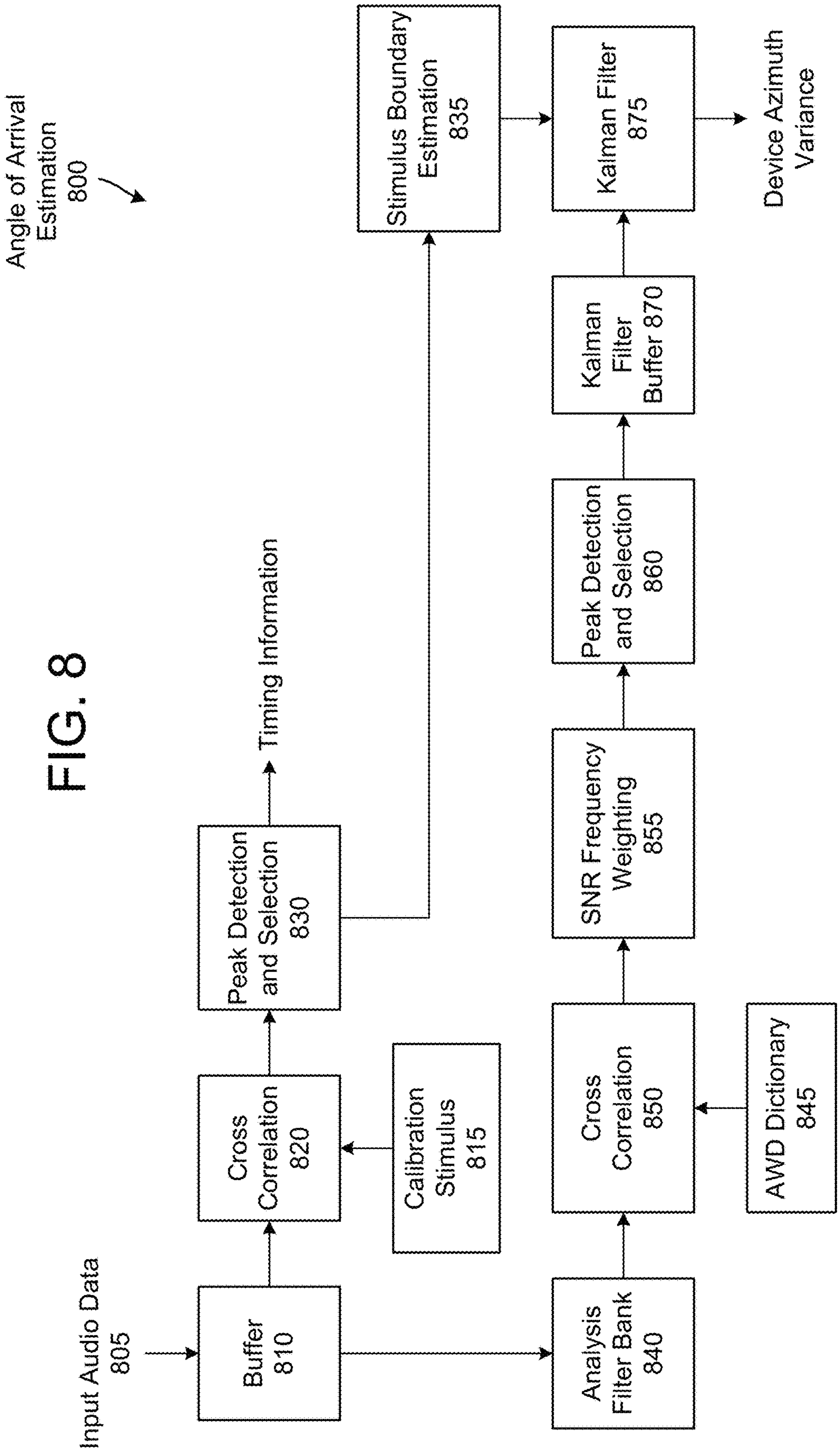
FIG. 8 illustrates an example component diagram for performing angle of arrival estimation according to embodiments of the present disclosure.

FIG. 8 illustrates an example component diagram for performing angle of arrival estimation according to embodiments of the present disclosure. As illustrated in FIG. 8, the system 100 may perform angle of arrival estimation 800 to determine an angle of arrival (e.g., device azimuth) and a corresponding variance, as well as timing information associated with the audible sounds captured during the calibration sequence. The system 100 may use the timing information to determine a distance between each of the devices.

The system 100 may begin the angle of arrival estimation 800 by receiving input audio data 805 and storing the input audio data 805 in a buffer component 810. The buffer component 810 may output the input audio data 805 to a first cross-correlation component 820 configured to perform a cross-correlation between the input audio data 805 and a calibration stimulus 815 to generate first cross-correlation data. For example, the cross-correlation component 820 may perform match filtering by determining a cross-correlation between the calibration stimulus 315 (e.g., calibration tone output by each device) and the input audio data 805 associated with each microphone.

The first cross-correlation component 820 sends the first cross-correlation data to a first peak detection and selection component 830 that is configured to identify first peak(s) represented in the first cross-correlation data and select a portion of the first cross-correlation data corresponding to the first peak(s). For example, the first peak detection and selection component 830 may locate peaks in the match filter outputs (e.g., first cross-correlation data) and select appropriate peaks by filtering out secondary peaks from reflections.

Using the selected first peak(s), the first peak detection and selection component 830 may generate timing data representing timing information that may be used by the device mapping compute component 320 to determine a distance between the devices. In some examples, the first peak detection and selection component 830 may generate the timing information that indicates a time associated with each individual peak detected in the first cross-correlation data. However, the disclosure is not limited thereto, and in other examples, the first peak detection and selection component 830 may determine a time difference between the peaks detected in the first cross-correlation data without departing from the disclosure. Thus, the timing information may include timestamps corresponding to the first peak(s), a time difference between peak(s), and/or the like without departing from the disclosure. In addition, the first peak detection and selection component 830 may send the selected peak(s) to a stimulus boundary estimation component 835 that is configured to determine a boundary corresponding to the stimulus represented in the input audio data 805.

The buffer component 810 may also output the input audio data 805 to an analysis filter bank component 840 that is configured to filter the input audio data 805 using multiple filters. The analysis filter bank component 840 may output the filtered audio data to a second cross-correlation component 850 that is configured to perform a second cross-correlation between the filtered audio data and acoustic wave decomposition (AWD) dictionary data 845 to generate second cross-correlation data.

A signal-to-noise ratio (SNR) frequency weighting component 855 may process the second cross-correlation data before a second peak detection and selection component 860 may detect second peak(s) represented in the second cross-correlation data and select a portion of the second cross-correlation data corresponding to the second peak(s). The output of the second peak detection and selection component 860 is sent to a Kalman filter buffer component 870, which stores second peak(s) prior to filtering. Finally, a Kalman filter component 875 may receive the estimated boundary generated by the stimulus boundary estimation component 835 and the second peak(s) stored in the Kalman filter buffer component 870 and may determine a device azimuth and/or a variance corresponding to the device azimuth.

While not illustrated in FIG. 8, each device may perform the steps for multiple microphones. For example, if the device includes four microphones, the timing information may include timestamps for each of the four microphones without departing from the disclosure. Thus, the timing information may include a timestamp for each audible sound (e.g., calibration tone) captured by each microphone, such that if there are three audible sounds (e.g., three separate devices generating a calibration tone), the timing information will include 12 timestamps (e.g., three timestamps for each of the four microphones). However, the disclosure is not limited thereto, and the number of microphones and/or the timestamps may vary. In some examples, the device may generate the timestamps using only a subset of the microphones without departing from the disclosure. For example, if the device includes eight microphones, the device may only determine timestamps using four of the microphones without departing from the disclosure. Additionally or alternatively, the device may generate timing information that corresponds to statistical information based on the timestamps. For example, the timing information may represent a mean (e.g., average) timestamp and a variance without departing from the disclosure.

Similarly, the device may determine the variance using multiple microphones. For example, four microphones may generate four separate measurements, and the device can generate an inter-microphone variance value to compare these measurements. Thus, a lower variance value may indicate that the results are more accurate (e.g., more consistency between microphones), whereas a higher variance value may indicate that the results are less accurate (e.g., at least one of the microphones is very different than the others).

While not illustrated in FIG. 8, in some examples the secondary devices 410 may include an additional component that is configured to consolidate the audio into a central point. For example, the additional component may process the audio data and/or cross correlation data generated by each of the microphones to determine a single timestamp for each peak, which may be included in the timing information sent to the primary device 410. Thus, the primary device 410 may receive precise timing information from each of the secondary devices 412 and perform time difference of arrival (TDOA) estimation to generate TDOA data that may be used to generate the device map. In other examples, the additional component may be included in the primary device 410, instead of the secondary devices 412, without departing from the disclosure. For example, the additional component in the primary device 410 may receive the timing information from each of the secondary devices 412, determine a central point for each secondary device 412, and then perform the TDOA estimation.

Figure 9:
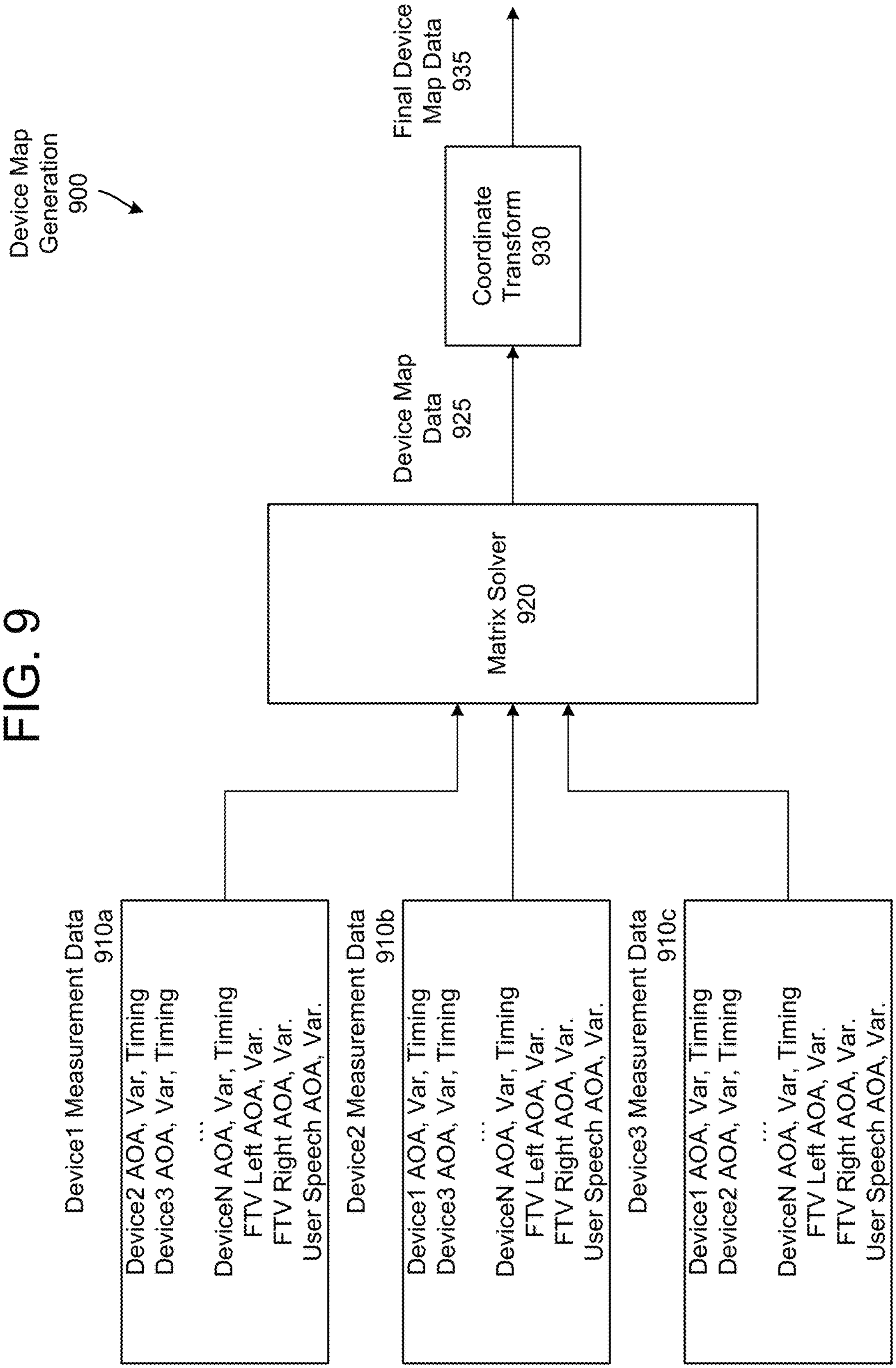
FIG. 9 illustrates an example component diagram for performing multi-device localization and device map generation according to embodiments of the present disclosure.

FIG. 9 illustrates an example component diagram for performing multi-device localization and device map generation according to embodiments of the present disclosure. As illustrated in FIG. 9, the system 100 may perform device map generation 900 to process measurement data 910 generated by the devices 410/412 in order to generate device map data representing a device map for the flexible home theater group. As described above with regard to FIG. 6, the device map data may include location(s) associated with each of the devices 410/412, a location of a television, and/or a location of a listening position 210. In some examples, the device map data may include additional information, such as device descriptors or other information corresponding to the devices 410/412 included in the device map.

As illustrated in FIG. 9, a matrix solver component 920 may receive the measurement data 910 from each of the devices 410/412. For example, the matrix solver component 920 may receive first data 910*a* from a first device (e.g., Device1), second data 910*b* from a second device (e.g., Device2), and third data 910*c* from a third device 910*c*. However, the disclosure is not limited thereto and the number of devices and/or the number of unique data may vary without departing from the disclosure.

As illustrated in FIG. 9, the measurement data 910 may include information associated with each of the other devices 410/412, such as an AOA value, a variance associated with the AOA value, and/or timing information corresponding to first peak(s). However, this is intended to conceptually illustrate an example and the disclosure is not limited thereto. Additionally or alternatively, the measurement data 910 may include information associated with user speech (e.g., AOA value and associated variance) and/or information associated with the television (e.g., AOA and variance associated with a left channel and a right channel of the television), although the disclosure is not limited thereto.

Using the measurement data 910, the matrix solver component 920 may perform localization and generate device map data 925 indicating location(s) associated with each of the devices 410/412, a location of a television, a location of a listening position 210, and/or the like. A coordinate transform component 930 may transform the device map data 925 into final device map data 935. For example, the coordinate transform component 930 may generate the final device map data 935 using a fixed perspective, such that the listening position 210 is at the origin (e.g., intersection between the horizontal axis and the vertical axis in a two-dimensional plane) and the user's look direction (e.g., direction between the listening position 210 and the television) is along the vertical axis. Using this frame of reference, the coordinate transform component 930 may transform the locations (e.g., [x,y] coordinates) such that each coordinate value indicates a distance from the listening position 210 along the horizontal and/or vertical axis.

In some examples, the device map data 925 may correspond to two-dimensional (2D) coordinates, such as a top-level map of a room. However, the disclosure is not limited thereto, and in other examples the device map data 925 may correspond to three dimensional (3D) coordinates without departing from the disclosure. Additionally or alternatively, the device map data 925 may indicate locations using relative positions, such as representing a relative location using an angle and/or distance from a reference point (e.g., device location) without departing from the disclosure. However, the disclosure is not limited thereto, and the device map data 925 may represent locations using other techniques without departing from the disclosure.

Figure 10:
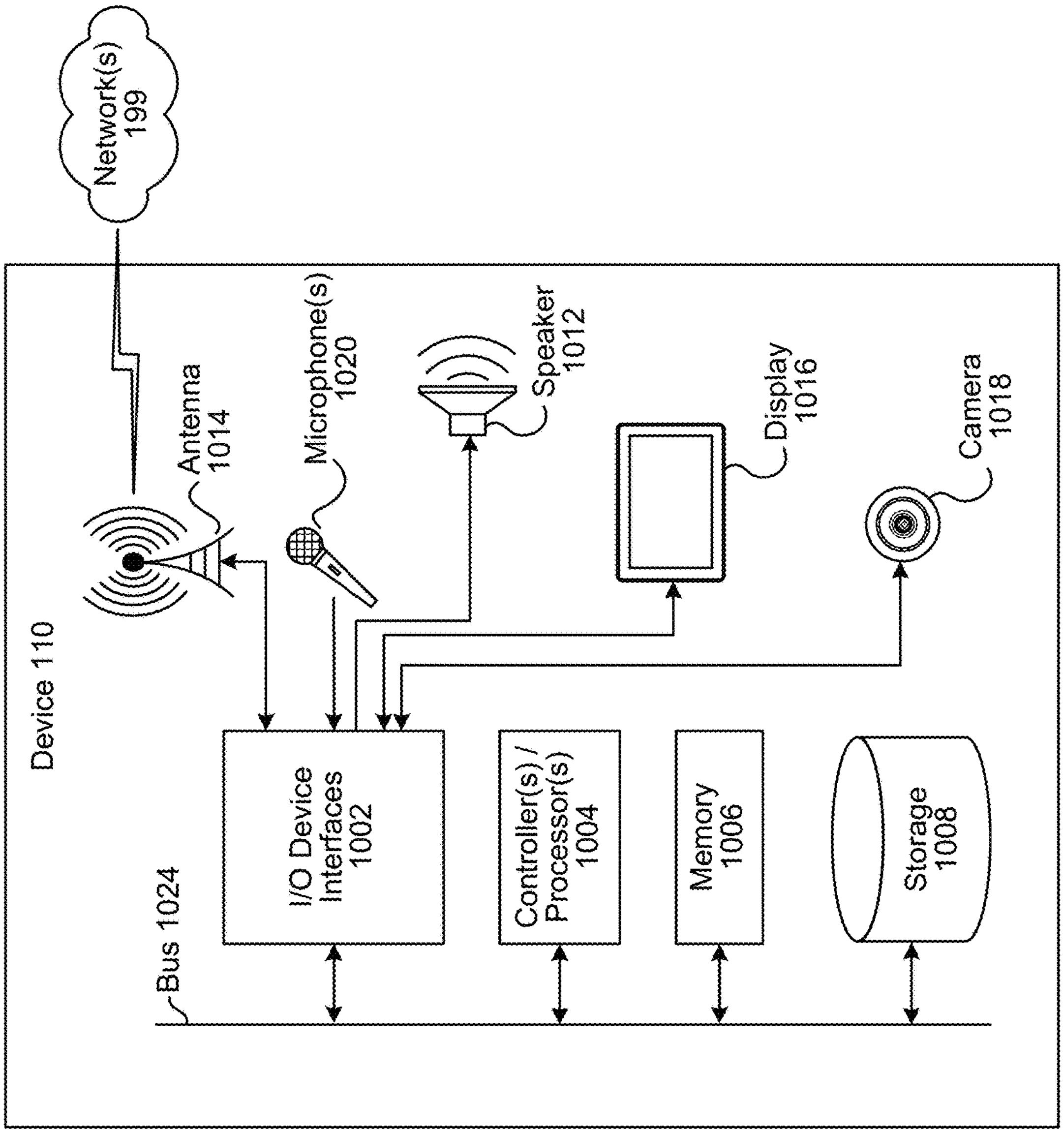
FIG. 10 is a block diagram conceptually illustrating example components of a device, according to embodiments of the present disclosure.
Figure 11:
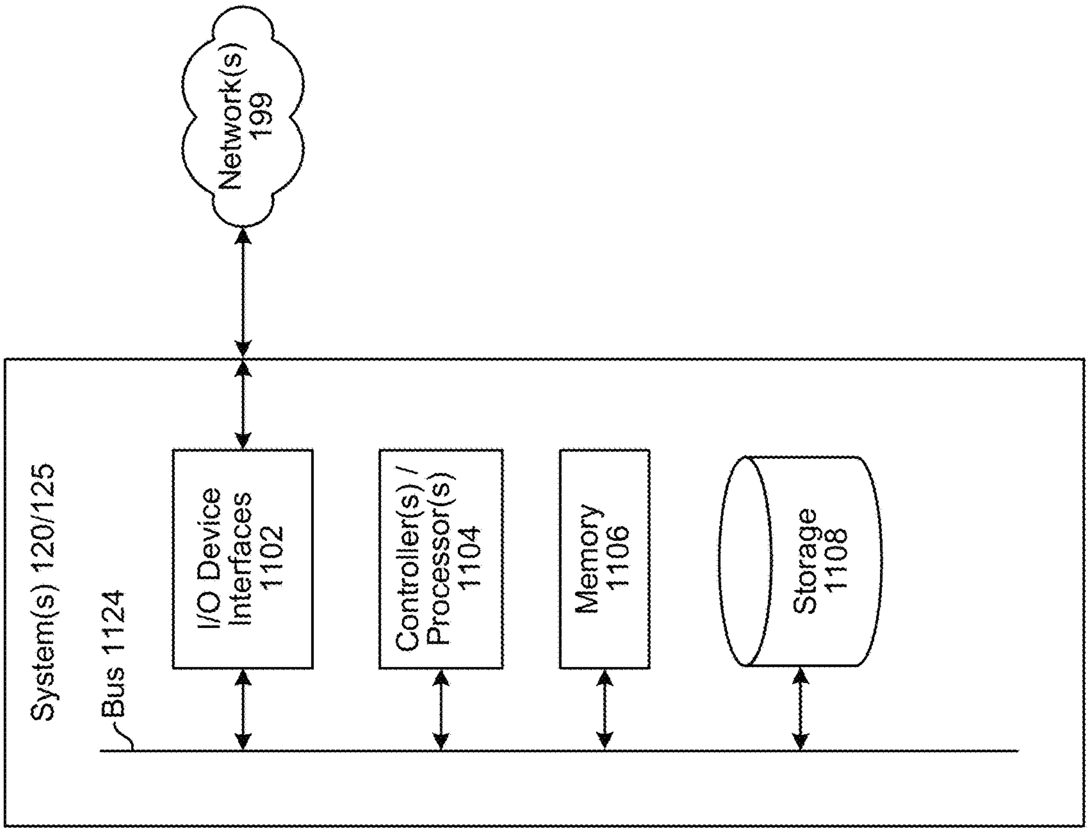
FIG. 11 is a block diagram conceptually illustrating example components of a system, according to embodiments of the present disclosure.

FIG. 10 is a block diagram conceptually illustrating a device 110 that may be used with the remote system 120. FIG. 11 is a block diagram conceptually illustrating example components of a remote device, such as the remote system 120, which may assist with ASR processing, NLU processing, etc.; and a skill component 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as one or more remote systems 120 for performing ASR processing, one or more remote systems 120 for performing NLU processing, and one or more skill component 125, etc. In operation, each of these systems may include computer-readable and computer-executable instructions that reside on the respective device (120/125), as will be discussed further below.

Each of these devices (110/120/125) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120/125) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1002/1102).

Computer instructions for operating each device (110/120/125) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120/125) includes input/output device interfaces (1002/1102). A variety of components may be connected through the input/output device interfaces (1002/1102), as will be discussed further below. Additionally, each device (110/120/125) may include an address/data bus (1024/1124) for conveying data among components of the respective device. Each component within a device (110/120/125) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device 110, the remote system 120, and/or a skill component 125 may include their own dedicated processors, memory, and/or storage. Alternatively, one or more of the components of the device 110, the remote system 120, and/or a skill component 125 may utilize the I/O interfaces (1002/1102), processor(s) (1004/1104), memory (1006/1106), and/or storage (1008/1108) of the device(s) 110, system 120, or the skill component 125, respectively. Thus, the ASR component 250 may have its own I/O interface(s), processor(s), memory, and/or storage; the NLU component 260 may have its own I/O interface(s), processor (s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the remote system 120, and a skill component 125, as described herein, are illustrative, and may be located as a stand-alone device or may be included, in whole or in part, as a component of a larger device or system.

Figure 12:
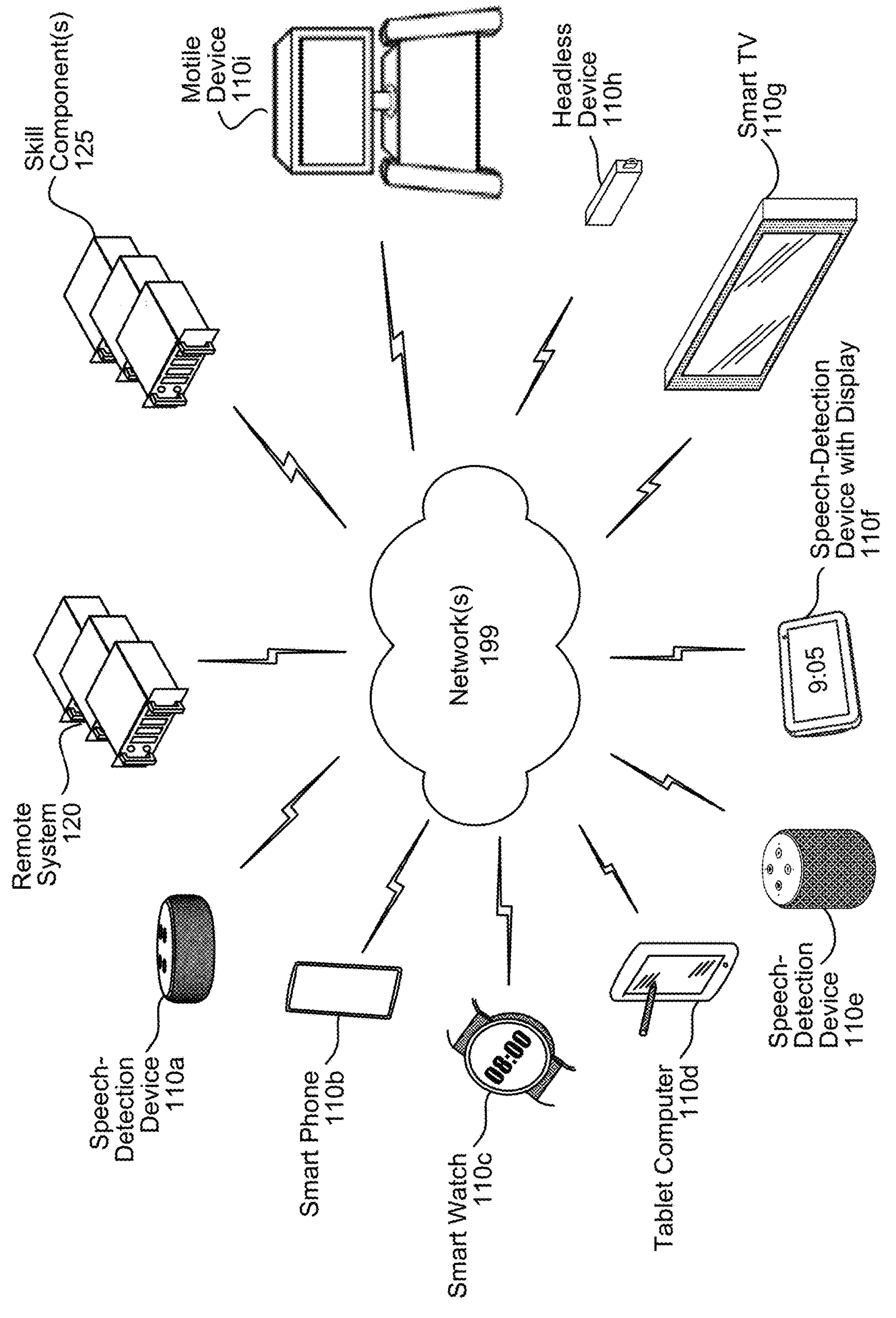
FIG. 12 illustrates an example of a computer network for use with the overall system, according to embodiments of the present disclosure.

As illustrated in FIG. 12, multiple devices (110*a*-110*k*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a speech-detection device 110*e*, a display device 110*f*, a smart television 110*g*, a headless device 110*h*, and/or a motile device 110*i* may be connected to the network(s) 199 through a wireless service provider, over a Wi-Fi or cellular network connection, or the like. Other devices are included as network-connected support devices, such as the remote system 120, the skill component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the remote system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:

sending, during a first time range, by a first device to a second device and a third device, first data corresponding to a calibration schedule that instructs (i) the second device to generate a first sound during a second time range after the first time range and (ii) the third device to generate a second sound during a third time range after the second time range, wherein the first device is at a first location, wherein the first sound and the second sound are outside a human hearing range;

receiving, by the first device from the third device, second data representing a first direction relative to the third device, the first direction associated with the first sound;

receiving, by the first device from the second device, third data representing a second direction relative to the second device, the second direction associated with the second sound; and generating, using the second data and the third data, map data indicating a second location associated with the second device and a third location associated with the third device.

2. The computer-implemented method of claim 1, wherein the first sound is outside a frequency range of 20 Hz to 20 KHz.

3. The computer-implemented method of claim 1, wherein the second sound is outside a frequency range of 20 Hz to 20 kHz.

4. The computer-implemented method of claim 1, wherein the second data represents a first angle of arrival associated with the first sound, the first angle of arrival corresponding to the first direction relative to the third device.

5. The computer-implemented method of claim 1, wherein the third data represents a second angle of arrival associated with the second sound, the second angle of arrival corresponding to the second direction relative to the second device.

6. The computer-implemented method of claim 1, further comprising:

receiving, by the first device from the second device, fourth data representing a third direction relative to the second device, the third direction associated with speech input;

receiving, by the first device from the third device, fifth data representing a fourth direction relative to the third device, the fourth direction associated with the speech input; and determining, using the fourth data and the fifth data, a fourth location associated with the speech input, wherein the map data indicates the fourth location.

7. The computer-implemented method of claim 6, wherein generating the map data further comprises:

assigning first coordinate values to the fourth location;

determining, using the first coordinate values, second coordinate values corresponding to the second location;

determining, using the first coordinate values and the second coordinate values, third coordinate values corresponding to the fourth location; and generating the map data, the map data associating the first coordinate values with a source of the speech input, the second coordinate values with the second device, and the third coordinate values with the third device.

8. The computer-implemented method of claim 1, further comprising:

causing, by the first device, a fourth device to generate a third sound using a first loudspeaker associated with the fourth device;

causing, by the first device, the fourth device to generate a fourth sound using a second loudspeaker associated with the fourth device;

determining a fourth location corresponding to the first loudspeaker;

determining a fifth location corresponding to the second loudspeaker; and determining, using the fourth location and the fifth location, a sixth location associated with the fourth device.

9. The computer-implemented method of claim 8, wherein generating the map data further comprises:

determining first coordinate values corresponding to a source of speech input;

determining second coordinate values corresponding to the sixth location;

determining, using the first coordinate values, third coordinate values corresponding to the second location;

determining, using the first coordinate values, fourth coordinate values corresponding to the third location; and generating the map data, the map data associating the first coordinate values with the source of the speech input, the second coordinate values with the fourth device, the third coordinate values with the second device, and the fourth coordinate values with the third device.

10. The computer-implemented method of claim 1, wherein the third data includes a third direction relative to the second device, the third direction associated with a third sound generated by a fourth device, the computer-implemented method further comprising:

receiving, by the first device from the fourth device, fourth data, the fourth data representing (i) a fourth direction relative to the fourth device, the fourth direction associated with the first sound, and (ii) a fifth direction relative to the fourth device, the fifth direction associated with the second sound;

determining the second location using the second data, the third data, and the fourth data;

determining the third location using the second data, the third data, and the fourth data; and determining a fourth location associated with the fourth device using the second data, the third data, and the fourth data.

11. The computer-implemented method of claim 1, wherein the third data includes a third direction relative to the second device, the third direction associated with a third sound generated by a fourth device, the computer-implemented method further comprising:

receiving, by the first device from the fourth device, fourth data, the fourth data representing (i) a fourth direction relative to the fourth device, the fourth direction associated with the first sound, and (ii) a fifth direction relative to the fourth device, the fifth direction associated with the second sound;

determining, using at least the second data, a first orientation of the second device; and determining, using at least the fourth data, a second orientation of the fourth device, wherein the map data includes a first association between the second device and the first orientation and a second association between the fourth device and the second orientation.

12. The computer-implemented method of claim 1, further comprising:

generating, using the map data, (i) first coefficient values corresponding to the second device and (ii) second coefficient values corresponding to the third device; and causing, by the first device, (i) the second device to generate first audio using the first coefficient values and (ii) third device to generate second audio using the second coefficient values.

13. A system comprising:

at least one processor; and memory including instructions operable to be executed by the at least one processor to cause the system to:

send, by a first device to a second device, first data indicating that the first device will generate a first sound during a first time range and instructing the second device to generate a second sound during a second time range, wherein the first sound and the second sound are outside a human hearing range;

generate, during the first time range, the first sound;

generate audio data including a representation of the second sound;

determining, using the audio data, a first direction relative to the first device that is associated with the second sound;

receive, by the first device from the second device, second data including a second direction relative to the second device, the second direction associated with the first sound; and generate, using the first direction and the second direction, map data indicating a first location associated with the first device and a second location associated with the second device.

14. The system of claim 13, wherein the memory further comprises instructions that, when executed by the at least one processor, further cause the system to:

determine, by the first device, third data representing a third direction relative to the first device, the third direction associated with speech input;

receive, by the first device from the second device, fourth data representing a fourth direction relative to the second device, the fourth direction associated with the speech input; and determine, using the third data and the fourth data, a third location associated with the speech input, wherein the map data indicates the third location.

15. The system of claim 14, wherein the memory further comprises instructions that, when executed by the at least one processor, further cause the system to:

assign first coordinate values to the third location;

determine, using the first coordinate values, second coordinate values corresponding to the first location;

determine, using the first coordinate values and the second coordinate values, third coordinate values corresponding to the second location; and generate the map data, the map data associating the first coordinate values with a source of the speech input, the second coordinate values with the first device, and the third coordinate values with the second device.

16. The system of claim 13, wherein the memory further comprises instructions that, when executed by the at least one processor, further cause the system to:

cause, by the first device, a third device to generate a third sound using a first loudspeaker associated with the third device;

cause, by the first device, the third device to generate a fourth sound using a second loudspeaker associated with the third device;

determine a third location corresponding to the first loudspeaker;

determine a fourth location corresponding to the second loudspeaker; and determine, using the third location and the fourth location, a fifth location associated with the third device.

17. The system of claim 16, wherein the memory further comprises instructions that, when executed by the at least one processor, further cause the system to:

determine first coordinate values corresponding to a source of speech input;

determine second coordinate values corresponding to the fifth location;

determine, using the first coordinate values, third coordinate values corresponding to the first location;

determine, using the first coordinate values, fourth coordinate values corresponding to the second location; and generate the map data, the map data associating the first coordinate values with the source of the speech input, the second coordinate values with the third device, the third coordinate values with the first device, and the fourth coordinate values with the second device.

18. The system of claim 13, wherein the second data includes a third direction relative to the second device, the third direction associated with a third sound generated by a third device, and the memory further comprises instructions that, when executed by the at least one processor, further cause the system to:

receive, by the first device from the third device, third data, the third data representing (i) a fourth direction relative to the third device, the fourth direction associated with the first sound, and (ii) a fifth direction relative to the third device, the fifth direction associated with the second sound;

determine the first location using the first data, the second data, and the third data;

determine the second location using the first data, the second data and the third data; and determine a third location associated with the third device using the first data, the second data, and the third data.

19. The system of claim 13, wherein the first sound is outside a frequency range of 20 Hz to 20 kHz.

20. The system of claim 13, wherein the second sound is outside a frequency range of 20 Hz to 20 KHz.

* * * * *